Figure 1:
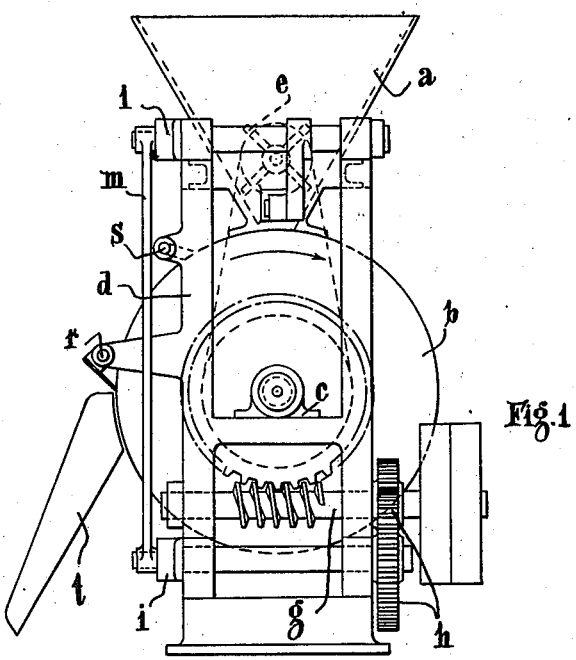

G. W. SINCLAIR.
APPARATUS FOR THE TREATMENT OF CALCIUM CYANAMID.
APPLICATION FILED JULY 7, 1914.

1,211,252.

Patented Jan. 2, 1917.
3 SHEETS—SHEET 1.

WITNESSES

INVENTOR
George William Sinclair
BY
ATTORNEY

G. W. SINCLAIR.
APPARATUS FOR THE TREATMENT OF CALCIUM CYANAMID.
APPLICATION FILED JULY 7, 1914.

1,211,252.

Patented Jan. 2, 1917.
3 SHEETS—SHEET 2.

WITNESSES

George W. Sinclair,
INVENTOR
BY
ATTORNEYS

G. W. SINCLAIR.
APPARATUS FOR THE TREATMENT OF CALCIUM CYANAMID.
APPLICATION FILED JULY 7, 1914.

1,211,252.

Patented Jan. 2, 1917.
3 SHEETS—SHEET 3.

George W. Sinclair
INVENTOR

WITNESSES

BY
ATTORNEYS

UNITED STATES PATENT OFFICE.

GEORGE WILLIAM SINCLAIR, OF ODDA, NORWAY.

APPARATUS FOR THE TREATMENT OF CALCIUM CYANAMID.

1,211,252.　Specification of Letters Patent.　Patented Jan. 2, 1917.

Application filed July 7, 1914. Serial No. 849,583.

*To all whom it may concern:*

Be it known that I, GEORGE WILLIAM SINCLAIR, a subject of the King of Great Britain and Ireland, and residing at Odda, Norway, have invented certain new and useful Apparatus for the Treatment of Calcium Cyanamid, of which the following is a specification.

This invention relates to an improved apparatus for granulating calcium cyanamid.

It is well known that commercial calcium cyanamid after having been ground is extremely dusty and its handling and manipulation is in consequence attended with considerable inconvenience and discomfort. With a view to reducing the dustiness it is usual to mix the finely ground cyanamid with a certain proportion of some mineral oil but this method is not entirely satisfactory as in a comparatively short time the oil becomes dried up and the cyanamid is once more reduced to a dusty condition. Many attempts have been made to overcome this disadvantage by treating the cyanamid after grinding in such a manner as to form a product consisting of small grains or granules instead of fine powder, but hitherto no entirely successful process for the purpose has been evolved.

The object of the present invention is to devise a satisfactory process and apparatus for the production of granulated calcium cyanamid which will retain its granular structure for a long period of time so that it may be readily handled and manipulated with but little liability to become dusty or powdery, thus obviating the disadvantages above referred to.

According to my invention I mix the powdered calcium cyanamid with water until it assumes a plastic or semi-fluid consistency and I feed this plastic or semi-fluid material on to a grooved, fluted or channeled cylinder, disk or other convenient rotatable or movable member from the grooves, channels or flutings in which the material is subsequently extracted by any convenient means.

The invention also consists in apparatus for producing granulated calcium cyanamid comprising a hopper for containing the plastic or semi-fluid material, a grooved or fluted cylinder or other rotatable or movable member forming a closure for the bottom of the hopper and means for removing the material from the grooves or the like in said member.

The invention also consists in the provision of means for heating the cylinder or other grooved or channeled member so that the material will be caused to leave the grooves without adhering thereto or to the means employed for removing the same and to break into pieces of suitable length.

The invention also consists in apparatus of the above kind in which the hopper is given a transverse movement relatively to the grooves or channels in the cylinder or like member to assist in spreading the material evenly within said grooves.

A further object of the present invention is to provide means which will facilitate the feeding of the pasty or semi-fluid material to the granulating apparatus, and the invention consists in the provision of one or more plungers or like members arranged within the hopper or receptacle for the material and to which is given a reciprocating movement by any suitable means for the purpose of forcing the material into contact with the granulating member.

The invention also consists in granulating apparatus for calcium cyanamid comprising two cylinders, either plain or grooved, arranged in contact or with a small clearance space between and adapted to be rotated in opposite directions, the material being fed on to the cylinders at the part adjacent to the line of contact or clearance space.

The invention also consists in other details and arrangements hereinafter more particularly referred to.

Figure 2:
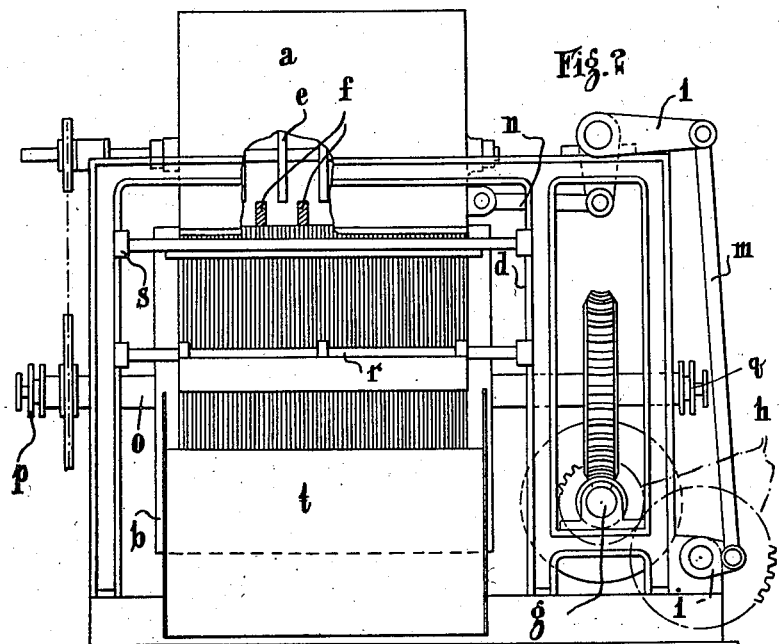
Figure 3:
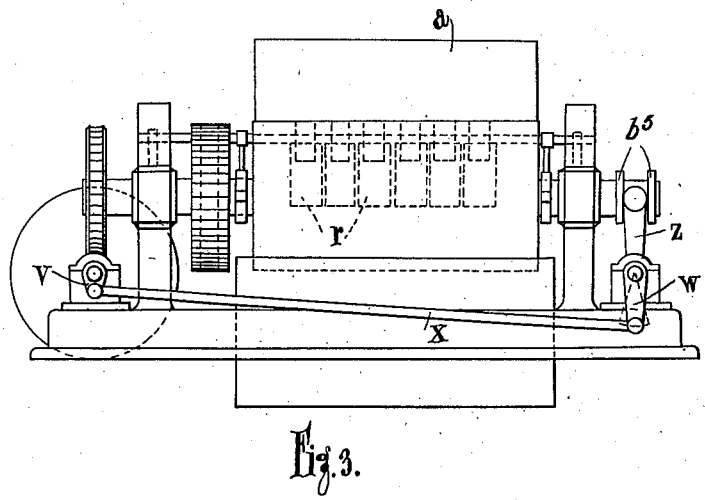
Figure 4:
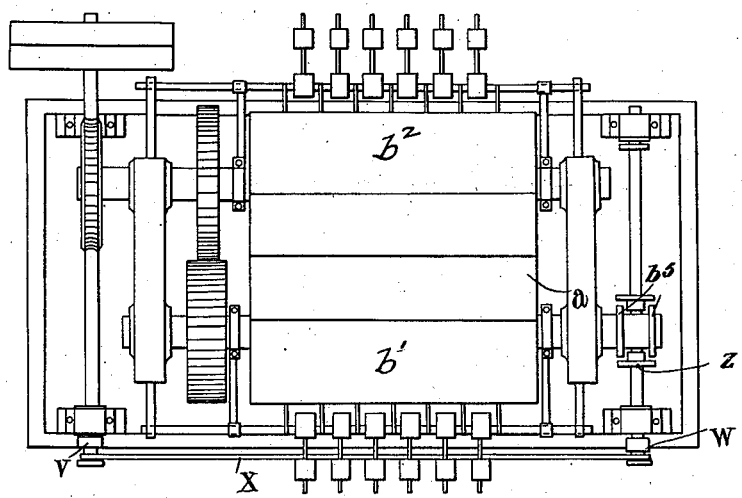
Figure 5:
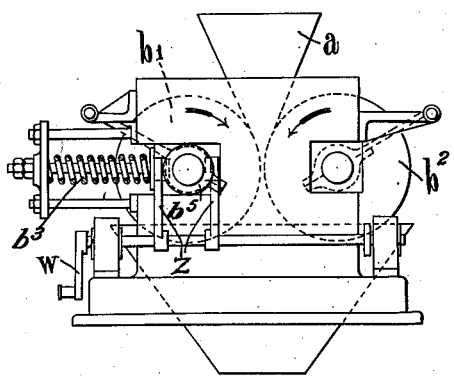
Figure 6:
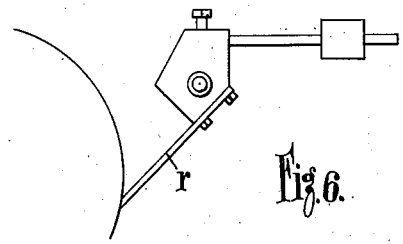
Figure 7:
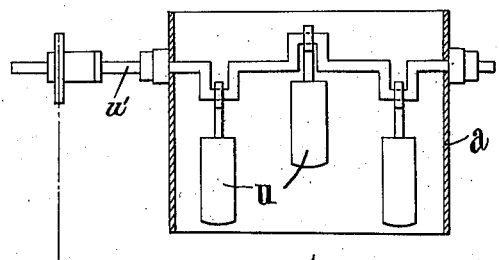

The accompanying drawings illustrate one mode of carrying out the invention:

Figure 1 is an end elevation showing one convenient form of apparatus constructed in accordance with the invention. Fig. 2 is a front elevation with a portion of the hopper broken away for the purpose of illustrating a detail. Figs. 3 and 4 are front elevation and plan view respectively of another form of the invention. Fig. 5 is an end elevation of the same form, but this view adds a spring for forcing the bearing of one roller inward. Fig. 6 is a detail of one of the scrapers. Fig. 7 is a vertical section through the hopper, showing plungers which may be used therein.

In carrying my invention into effect in one convenient manner I provide a hopper or like receptacle $a$ open at its upper and lower ends and adapted to surmount a cylinder or like rotatable member $b$ which is mounted in bearings $c$ carried in any suitable framework $d$ and is positioned in such a manner that it forms a closure for the lower end of the hopper or like feeding device $a$. The cylinder or other member $b$ is provided with grooves, channels or flutings upon its outer surface (Fig. 2) of any convenient size and shape in cross-section depending upon the size of the granules that are to be formed, the grooves or the like being arranged spirally upon the surface of the cylinder or parallel to one another at right angles to the axis of the same as shown in Fig. 2 or in any other convenient manner.

Within the hopper $a$ I mount an agitator $e$ of any suitable form and construction for the purpose of agitating the material and assisting in feeding the same to the cylinder and to insure that the grooves of the cylinder may be completely filled with the mass fed from the hopper during the movement of the cylinder or like member it has been found advantageous to divide the hopper into a series of compartments by means of transverse partitions $f$ extending across the hopper and contacting throughout their length with the surface of the cylinder or like member and by means of any suitable mechanism a reciprocating motion in the direction of the axis of the cylinder is imparted to the hopper so that the mass is thereby carried transversely over the grooves in the cylinder and pressed down by the lower edges of the partitions $f$ above referred to, which thus have a spatula-like action. In the example illustrated the motion of the hopper is obtained from the driving shaft $g$ of the apparatus by means of the reduction spur gearing $h$, crank $i$ and bell crank lever $l$ and the links $m$ and $n$, but it is to be understood that this mechanism is given by way of example only and any other suitable arrangement or device may be adopted for this purpose.

Any suitable steam heating or other arrangement may be provided within the cylinder $b$ for heating the same, or it may be heated externally, the temperature depending upon the speed of rotation of the cylinder and upon the amount of moisture in the mixture being treated.

In the machine illustrated in the drawings the hollow shaft $o$ upon which the cylinder $b$ is mounted is provided with glands $p$ $q$ for the ingress of live steam into the cylinder and the egress therefrom of exhaust steam and water of condensation.

At a convenient position with respect to the cylinder, say, for example, at an angle of 270° from the hopper in the direction of rotation of the cylinder I arrange a scraper $r$ or series of scrapers adapted to engage with the grooves in the cylinder and between the scraper or scrapers and the hopper is placed an oiling device $s$ which may consist of a felt pad or its equivalent so arranged that an even film of oil is delivered to the surface of the cylinder. In a convenient position below the scraper I provide, if desired or necessary, a delivery chute or the like $t$.

The finely powdered cyanamid is mixed preferably with about 50 per cent. of its weight of water under which conditions the mixture assumes a semi-fluid consistency but sets in a short time into a compact mass. The mixture may either be fed to the hopper in the semi-liquid state or it may be allowed to stand after mixing until it assumes a firmer consistency and if fed to the hopper in the latter state the heat of the cylinder will cause it to become plastic.

While the preferred proportion of water is given above it will be understood that a wide range of mixture is permissible in which the amount of water may vary from, say, 15 per cent. to 75 per cent. of the weight of the calcium cyanamid with which it is to be mixed. The material within the hopper is fed by the devices above referred to to the cylinder so that it enters the grooves or flutings therein and is carried around therein until it meets the scraper or scrapers $r$ and the temperature of the cylinder is such that the material on meeting the scraper is caused to fall away from the apparatus in pieces of convenient length in such a manner that it will not adhere to any part of the apparatus and the resulting product having been allowed to set for a sufficient length of time, say, about half-an-hour is sufficiently hard to handle.

The cyanamid may be powdered to any degree of fineness that is found suitable in practice, a very satisfactory product being obtained when the residue on sieves having 900 and 5000 apertures per square centimeter does not exceed 5 per cent. and 25 per cent. respectively of the weight tested but it is not essential that these conditions be strictly adhered to. Further, it has been found that a satisfactory temperature for the drying cylinder is about 95° C. but a higher or lower temperature may be employed, if desired, while the speed of rotation of the cylinder is varied to suit the temperature that is employed.

I have found that by means of my invention I am enabled to produce calcium cyanamid capable of retaining its granular form for an indefinite period and characterized by the fact that there is an almost complete absence of dust even after prolonged exposure to the atmosphere.

It will be evident that my invention is not to be confined to the details of construction hereinbefore given by way of example nor to any particular degree of fineness to which the calcium cyanamid is ground, and I may suitably modify the arrangement of the various parts depending upon the particular practical conditions that my invention is designed to meet.

In carrying my invention into effect in another convenient manner I provide a hopper or receptacle for the mixture of cyanamid and water or water with admixtures, the lower part of which is closed by a grooved or fluted cylinder or member for effecting the granulation, and within the hopper or receptacle I arrange any convenient number of plungers or like devices $u$ with their axes preferably approximately radial to the cylinder. The plungers are mounted in any suitable manner so that they may have a vertical movement imparted to them by means of convenient mechanism either independently driven or operated from the granulating machine such, for instance, as the crank shaft $u'$ shown in Fig. 7. Thus the pasty mass is forced by the downward stroke of the plungers into the grooves or flutings upon the cylinder.

In a modification of the invention having the same object as the foregoing form of construction, namely, to facilitate the feeding of the material to the granulating machine I may provide two cylinders or rollers $b'$, $b^2$ in Fig. 5, both of which may be plain, or one or both of which may be furnished with grooves or flutings, the rollers being mounted horizontally with their axes parallel and in such position that their contiguous faces make contact with one another or have a small clearance space between them. The rollers may be of equal or unequal size and are adapted to be rotated in opposite directions with different peripheral speeds in such a manner that the material fed between them will be compressed in the grooves or will be caused to adhere to the surface of the cylinders and to be carried around upon the same. The rollers may be arranged to rotate in the same plane, and one or both may be provided with a scraper or system of scrapers or otherwise formed to suit the nature of the rollers employed.

Figs. 4 and 5 show that in some cases I contemplate reciprocating the rollers axially for the purpose of insuring an even disposition of the material over their surfaces. This may be accomplished in any suitable way, but is here illustrated as being brought about by a rotating crank $v$ connected by a link $x$ with a swinging crank $w$, and a fork $z$ moved by the latter and engaging flanges $b^5$ on the shaft of one roller as $b'$.

Any suitable means may be provided for feeding the material to the rollers and in the illustrated construction I provide suitable means for closing in the space between the rollers above the line of contact or clearance space by the hopper which may be furnished with plungers as hereinbefore referred to and with a suitable agitating device, and the rollers may or may not, as desired, be fitted with arrangements for heating.

Having now described my invention what I claim as new and desire to secure by Letters Patent is:—

1. Apparatus for producing granulated calcium cyanamid comprising a hopper for containing a plastic or semi-fluid mixture of calcium cyanamid and water, a grooved member movable relatively to and forming a closure for said hopper, a plurality of reciprocable plungers within said hopper and means for removing the material from the grooves in said member.

2. Apparatus for producing granulated calcium cyanamid comprising a hopper, a grooved cylinder rotating beneath and forming a closure for said hopper so that the plastic material may enter the grooves of said cylinder, means for giving an axial reciprocation to said hopper, and a scraper for removing the material from the grooves in said cylinder.

3. Apparatus for producing granulated calcium cyanamid comprising a hopper for containing a plastic or semi-fluid mixture of calcium cyanamid and water, a grooved rotary member movable past and forming a closure for said hopper, means for forcing said material out of the hopper and into the grooves of said member, and means for removing the material from the grooves in said member.

4. Apparatus for producing granulated calcium cyanamid comprising a hopper for containing a plastic or semi-fluid mixture of calcium cyanamid and water, a grooved member movable relatively to said hopper, means for heating said member, means for forcing said material out of the hopper and into the grooves of said member, and means for removing the material from the grooves in the said member.

5. Apparatus for producing granulated calcium cyanamid comprising a hopper for containing a plastic or semi-fluid mixture of calcium cyanamid and water, a grooved cylinder movable relatively to and forming a closure for said hopper, so that the plastic material may enter the grooves of said cylinder, means for giving a transverse motion to said hopper relatively to the direction of motion of the cylinder, a plurality of partitions within the said hopper contacting with said cylinder and a scraper for removing the material from the grooves in said cylinder.

6. Apparatus for producing granulated calcium cyanamid comprising a hopper for containing a plastic or semi-fluid mixture of calcium cyanamid and water, a grooved member movable relatively to and forming a closure for said hopper, a plurality of partitions within said hopper adapted to contact with said cylinder, an agitating device within said hopper, and means for removing the material from the grooves in said member.

7. Apparatus for producing granulated calcium cyanamid comprising a hopper for containing a plastic or semi-fluid mixture of calcium cyanamid and water, a grooved cylinder movable relatively to and forming a closure for said hopper, so that the plastic material may enter the grooves in said cylinder, means for moving said hopper axially relatively to said cylinder, means for heating said cylinder, a plurality of partitions within said hopper adapted to contact with said cylinder and a serrated scraper adapted to remove the material from said cylinder.

8. Apparatus for producing granulated calcium cyanamid comprising a pair of cylinders, means whereby they are rotated in opposite directions, a hopper for containing a plastic or semi-fluid mixture of calcium cyanamid and water and for feeding the same on to said cylinders, means for removing the material from the cylinders, and means for moving one of said cylinders in an axial direction relatively to the other.

9. Apparatus for producing granulated calcium cyanamid comprising two cylinders mounted horizontally with their axes parallel to one another, means for variably rotating said cylinders, a hopper for feeding a plastic or semi-fluid mixture of calcium cyanamid and water on to said cylinders, scraping means for removing the material from said cylinders and means for moving one of said cylinders axially relatively to the other cylinder.

In testimony whereof I have signed my name to this specification in the presence of two subscribing witnesses.

GEORGE WILLIAM SINCLAIR.

Witnesses:
BERTRAM H. MATTHEWS,
O. J. WORTH.